Dec. 4, 1962  W. L. RONNEY ETAL  3,066,541
EDDY CURRENT INSTRUMENT

Filed Sept. 14, 1959

INVENTORS
William L. Ronney
Rouholah Zargarpur

BY John C. Black
ATTORNEY

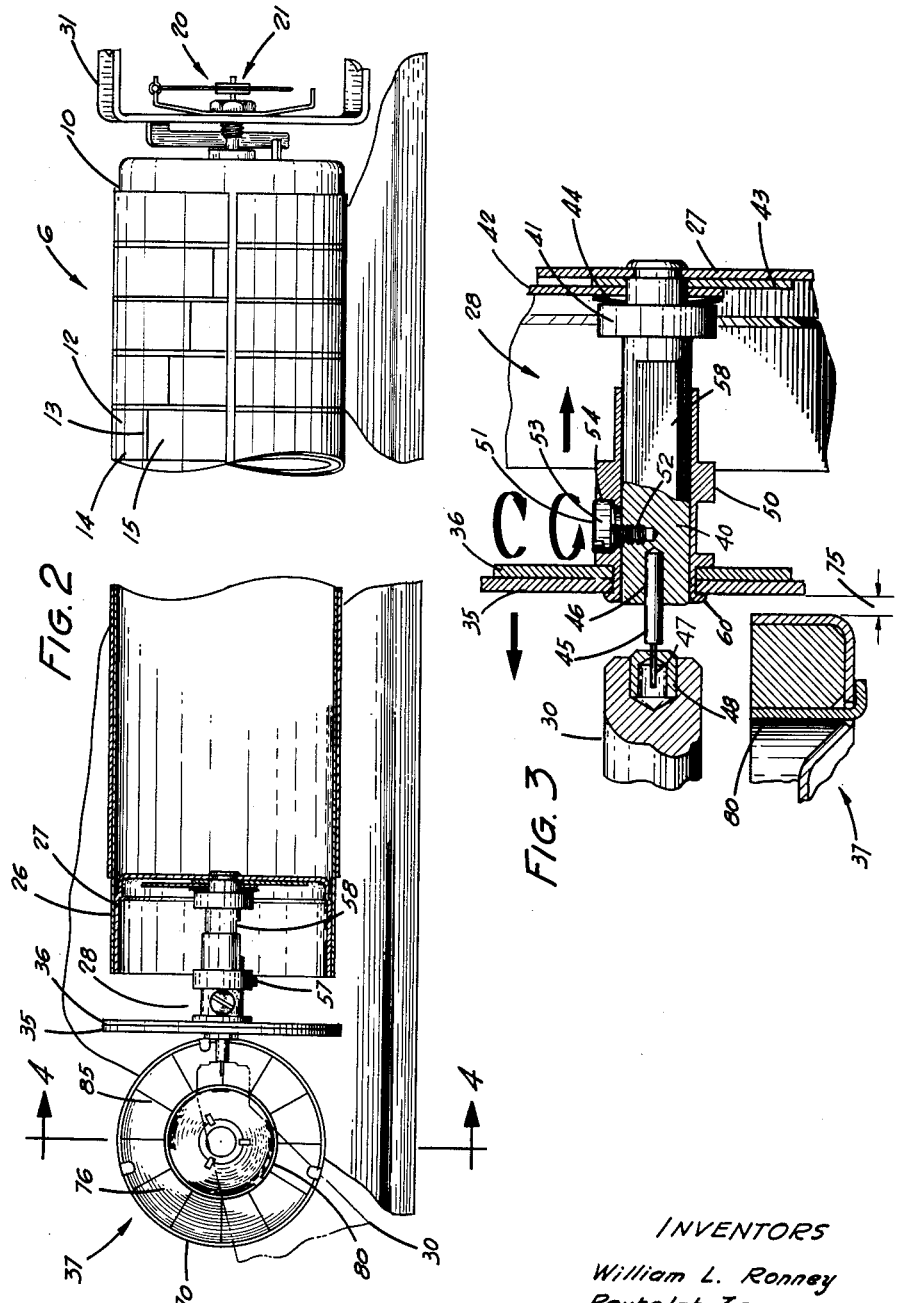

United States Patent Office 3,066,541
Patented Dec. 4, 1962

3,066,541
EDDY CURRENT INSTRUMENT
William L. Ronney, Park Ridge, and Rouholah Zargarpur, River Forest, Ill., assignors to Stewart-Warner Corporation, Chicago, Ill., a corporation of Virginia
Filed Sept. 14, 1959, Ser. No. 839,890
3 Claims. (Cl. 73—520)

This invention relates generally to gauges for indicating the speed of a rotating body and more particularly to the actuating mechanism for an eddy current instrument.

The name "eddy current instrument" for purposes of this application refers to a condition indicating instrument of the type in which a permanent magnet, rotated at speeds corresponding to the instantaneous value of a condition to be indicated, is disposed closely adjacent a metallic element of nonmagnetic material to produce eddy currents in the element. The eddy currents coact with the magnetic field of the magnet to produce angular displacement of the element as a function of the speed of the magnet. This type of instrument is generally used throughout the automotive industry to indicate engine and/or vehicle road speed.

In instruments of this type which employ an elongated drum and an elongated narrow slit in the dial face, considerable difficulty is experienced in making a simple economical drive connection without resorting to complicated calibration and/or temperature compensation means. The drum and the eddy current element are mounted on a horizontal axis which is substantially parallel to the instrument panel. However, the mechanical connecting means, i.e., flexible shaft, must enter the panel housing in a plane which is substantially at right angles to the drum axis and no simplified direct connection can be made.

In one commercial design, a cup-shaped eddy current element is used and a right angle gearing means is interposed between the flexible shaft and the magnet whereby the magnet can be located within the eddy cup. However, this construction leads to noise and wear problems in the gearing. Another commercial application utilizes a specially shaped eddy cup and a magnet and drive shaft disposed in a plane which is substantially at 45° to the drum axis. However, this involves more expensive construction and the necessary calibration and temperature compensation problems present manufacturing difficulties.

Accordingly, it is the primary object of the present invention to provide a simplified, economical drive means for an eddy current instrument. This object is achieved in the preferred embodiment by the use of an unusually simplified eddy disk, field plate, and calibrating means assembly carried by and coaxial with the drum shaft. This assembly permits the disposition of the magnet axis in any position relative to the drum axis so long as the periphery of the magnet and an adjacent effective surface of the eddy disk are maintained uniformly spaced in all angular positions of the magnet. In the preferred embodiment, the magnet axis is located in a plane normal to the drum axis for ease of magnet construction.

It is a relative object of the present invention to provide in an eddy current instrument a simplified economical calibration means.

Another object is the provision of an improved low cost magnet assembly.

Another object is the provision of an eddy current instrument with an improved means for preventing error being introduced by bearing end play in the indicator pivot shaft.

Other objects of the various features of the invention will be appreciated upon a perusal of the following description taken in conjunction with the accompanying drawings in which:

FIG. 2 is a sectional elevation view of the embodiment of FIG. 1 showing the details of the rotatable drum, its biasing means, and the improved eddy current type drive means;

FIG. 3 is an enlarged view partially in section showing the details of the improved calibrating means.

Figure 1:
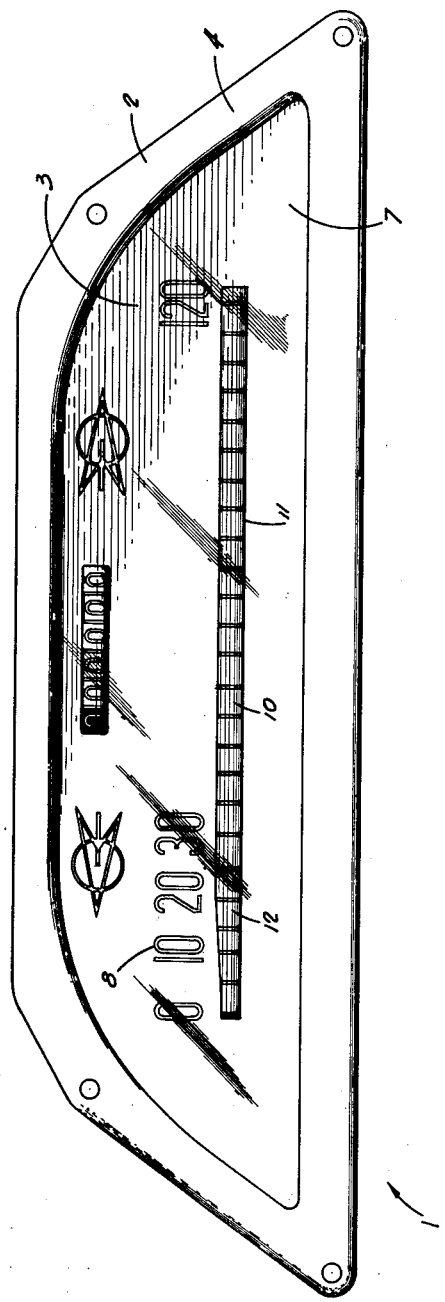
FIG. 1 is an elevation view of a typical drum type speedometer.
Figure 4:
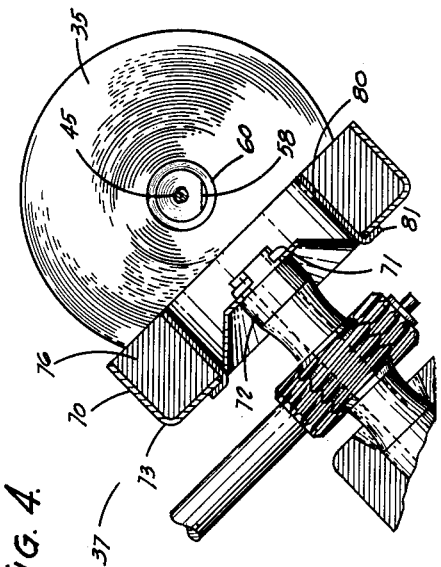
FIG. 4 is an elevation view along line 4—4 of FIG. 2.

The speedometer 1 (FIG. 1) comprises a metallic case 2 with an irregular cup-shaped portion 3 and a flange 4. The speedometer mechanism 6 (FIG. 2) is located within the cup-shaped portion 3 of the case. A face dial 7 with an appropriate scale 8 is secured to the case 2 in any well known manner.

A drum 10 is disposed behind an elongated rectangular slit 11 in the face dial. The drum 10 includes a plurality of adjacent parallel circumferential surface portions 12. Each portion 12 has a dividing line 13. The portion 12 is painted with one color, for example, red on one side 14 of the line 13 and with a contrasting color such as black on the other side 15 of the line.

The lines 13 in succeeding circumferential sections are progressively staggered a predetermined angular distance. In the zero speed position of the drum, only the color black will be visible through the slit 11. As the drum is rotated in response to the instantaneous speed of the vehicle, the red color of the succeeding circumferential portions of the drum will appear throughout the slit starting at the left-hand edge and progressing toward the right-hand edge as the speed increases. Thus at 20 miles an hour the visible portions of the first four sections 12 of the drum will be red whereas the remaining visible portions of the sections 12 will be black.

A conventional biasing spring assembly 20 is secured to the right-hand edge (FIG. 2) of the drum pivot assembly 21. The assembly 20 produces a counterforce on the drum which permits angular displacement of the drum until the counterforce of the assembly 20 is equal to the force produced on the drum by its drive means.

The drum includes an elongated metallic cylinder 26 which is closed at its left-hand end by a generally cup-shaped metallic element 27. A pivotal mounting assembly 28 is secured to the element 27 in coaxial relation with the drum. The assembly 28 is pivotally secured at its left-hand end to a stationary bracket 30 as will be described below. A stationary bracket 31 carries the pivotal mounting assembly 21 at the other end of the drum in a well known manner.

An eddy disk 35 and a field disk 36 of a nonpermanent magnetic material are carried by the assembly 28 in coaxial relation with the drum. A permanent magnet assembly 37 is rotatably mounted on an axis lying in a plane perpendicular to the drum axis with its periphery closely adjacent the eddy disk 35.

The assembly 28 (FIG. 3) further comprises a shaft 40 riveted to the element 27. The shaft 40 includes a shoulder portion 41. A pair of balancing plates 42 and 43 and a spring washer 44 are interposed between the shoulder 41 and the element 27. The balancing plates 42 and 43 are rotated about the axis of the drum in a well known manner to compensate for the static unbalance in the drum assembly. A pivot pin 45 is pressed into a bore 46 in the shaft. A reduced end portion 47 of the pivot pin is inserted through a conventional bearing 48 carried by the bracket 30.

A sleeve 50 is mounted for reciprocation upon the shaft 40. A screw 51 having an eccentric threaded section 52 is screwed into the shaft perpendicular to the shaft axis.

The head portion 53 of the screw is received in a transverse counterbore 54 on the sleeve 50. Hence, when the screw is rotated about the axis of the threaded section 52 the eccentric head portion 53 slides the sleeve 50 in one direction or the other along the shaft axis.

In this manner, the field plate and the eddy disk are moved toward or away from the magnet assembly 37 to vary the air gap. When the air gap is decreased, the magnetic field is strengthened to increase the sensitivity of the instrument. When the air gap is increased, the sensitivity of the instrument is decreased. Calibration of the instrument is, therefore, provided by proper adjustment of the screw 51. A set screw 57 (FIG. 2) engages the flat 58 (FIG. 3) on the shaft 40 to lock the sleeve 50 in place after cailbration is effected. The field plate 36 and the eddy disk 35 are rigidly staked to the sleeve 50 at 60.

The magnet assembly 37 comprises a generally cup-shaped element 70 of temperature compensating material of any well known type. The element 70 includes a generally truncated conical central section 71 which is suitably staked to a drive shaft 72. The outer periphery 73 of the element 70 is maintained in concentric relation with the axis of the shaft 72 so that, as the shaft rotates, the air gap 75 (FIG. 3) is maintained constant.

An annular magnet 76 is retained in the element 70 substantially in concentric relation with the outer periphery 73, for example by adhesive material. A generally annular soft iron ring 80 is suitably secured within the magnet aperture and retained by means of lugs 81 extending through the element 70 and bent over.

The magnet 76 in one preferred embodiment comprises 12 equally spaced circumferential poles indicated by lines 85. The magnet is preferably formed of ceramic material to permit a low cost with a relatively high strength. The effective external flux path between adjacent north-south poles extends from a north pole through the eddy disk 35, through the field plate 36, through the eddy disk, and thence to a south pole. The strength of the external field is appreciably increased by use of the soft iron ring 80.

In the typical prior art eddy current instruments, the magnet has been placed in very close proximity (.012") to the eddy current element in order to provide a minimum air gap and maximum torque. The air gap must be maintained uniform at all times. Even minute changes in this air gap in the order of .003" will appreciably affect the torque of the instrument and cause vibration. This requires a magnet, the periphery of which is perfectly concentric with the axis on which it rotates.

Ceramic magnets are not economically formed with a nearly perfect concentric periphery. Other types of magnets may be formed with substantially perfect concentricity. However, the cost is substantially higher than that of the ceramic magnet. Applicants' have permitted the use of the economical ceramic magnet by the single expedient of providing the metallic element 70 which is easily formed for substantially perfect concentric attachment to the shaft 72. It has been found that slight variances in the magnet concentricity produce no noticeable effects on the torque produced as the magnet rotates through its different angular positions.

Applicants' have effected further economies by making the element 70 of a temperature compensating material. Variances in field strength of the magnet caused by ambient temperature variations is compensated for by variances in the magnetic field conductivity of the cup-shaped element.

However, this construction has led to an increase in the effective air gap between the magnet and the eddy current disk. That is, the element 70 may have a thickness in the order of .025". The equivalent air gap is therefore .037" rather than .012".

By placing the field plate 36 in engagement with the eddy current disk 35, applicants' have in fact substantially reduced the entire external magnetic path. Prior art constructions so far as is known employ an air gap between the eddy disk and the field plate. Applicants' have found that the eddy disk and field plate may be rotated together and can therefore be secured one to the other to eliminate the air gap of the prior art constructions. As a result, the present construction has a magnetic path length in the order of one-third less than that of known prior art constructions. This results in significantly increased torque.

Because of the appreciable economies effected in the magnet and calibration structures, it is now possible to utilize a pure copper eddy current disk rather than the low cost aluminum disk. The excellent electrical conductivity of the copper substantially increases the available torque. Hence applicants' have provided a significantly less costly, tangent drive means which has significantly higher torque.

Where there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. An eddy current instrument comprising a frame, a shaft secured to the frame for rotation about a first axis, a sleeve mounted on the shaft for relative axial displacement thereon, mutually facing surfaces on the sleeve spaced axially with respect to the shaft and defining an opening extending to the shaft, a screw threaded into the shaft and having an eccentric head extending into the opening engaging at least one of the surfaces to adjust the sleeve axially on the shaft, a substantially flat eddy current element secured to the sleeve and defining a plane perpendicular to the first axis, a substantially flat field plate fixed to and adjacent one side of the eddy current element, said element, plate and sleeve being rigidly secured for common axial and rotational movements, a circular magnet supported by the frame for rotation about a second axis transverse to that of the first axis, said magnet including a plurality of magnetic poles circumferentially spaced on an outward portion of the magnet, an outer wall of temperature compensating material surrounding the magnetic poles and having an outside surface of circular cross-section with its center on the second axis and movable closely adjacent the eddy current element on the other side thereof.

2. An eddy current instrument comprising a frame, a shaft rotatably supported by the frame, a sleeve slidably mounted on the shaft for longitudinal movement thereon, means on the sleeve and shaft restricting relative rotation, an eddy current element secured to the sleeve for rotational and longitudinal movement therewith, mutually facing surfaces on the sleeve defining a transverse recess, a screw threadably connected to the shaft and having an eccentric head portion extending into the recess engaging at least one of said surfaces, said screw being operable to adjust the sleeve longitudinally of said shaft, a circular magnet rotatably supported by the frame and having a plurality of magnetic poles on its peripheral surface spaced from and movable relative to the eddy current element, and biasing means resisting the angular displacement of the eddy current element caused by rotation of the magnet, said instrument being calibrated solely by axially adjusting the element toward and away from the magnetic poles by means of the screw and sleeve.

3. An eddy current instrument comprising an eddy current element, a field plate secured in direct engagement on one side of the eddy current element, structure including a shaft operable to mount the eddy current element and field plate for common rotation about a first axis, a circular magnet having a plurality of spaced magnetic poles on its peripheral surface, a generally cup-shaped element of temperature compensating material secured over the magnet, a second shaft mounting the magnet and cup-shaped element for common rotation about a second axis not coaxial with the first axis, said cup-shaped element having an outer wall portion defining an outside surface of circular cross-section having the center thereof on the second axis, said outside surface being in adjacent spaced relation with a portion of the eddy current element on the other side thereof and defining a single air gap therebetween, means included in the eddy current element and field plate mounting structure in direct engagement with the first shaft for adjusting the axial position of the eddy current element and field plate toward and away from the outside surface to vary the air gap and calibrate the instrument, said biasing means resisting the annular displacement of the eddy current element and field plate caused by rotation of the magnet and cup-shaped element about said second axis.

References Cited in the file of this patent

UNITED STATES PATENTS

| | | |
|---|---|---|
| 745,468 | Warner | Dec. 1, 1903 |
| 1,035,378 | Menns | Aug. 13, 1912 |
| 1,038,016 | Stewart | Sept. 10, 1912 |
| 1,138,799 | Scott | May 11, 1915 |
| 1,611,089 | Wallis | Dec. 14, 1926 |
| 1,697,580 | Wallis | Jan. 1, 1929 |
| 2,648,019 | Rodanet | Aug. 4, 1953 |
| 2,743,967 | Lappe | May 1, 1956 |
| 2,798,174 | Helgeby | July 2, 1957 |
| 2,902,612 | Whearley | Sept. 1, 1959 |
| 2,909,365 | Helgeby | Oct. 20, 1959 |

FOREIGN PATENTS

| | | |
|---|---|---|
| 184,823 | Germany | May 10, 1907 |
| 294,115 | Germany | Sept. 14, 1916 |

UNITED STATES PATENT OFFICE
CERTIFICATE OF CORRECTION

Patent No. 3,066,541            December 4, 1962

William L. Ronney et al.

It is hereby certified that error appears in the above numbered patent requiring correction and that the said Letters Patent should read as corrected below.

Column 4, line 35, after "plane" insert -- extending --; column 5, line 3, for "coavial" read -- coaxial --.

Signed and sealed this 31st day of March 1964.

(SEAL)
Attest:
ERNEST W. SWIDER            EDWARD J. BRENNER

Attesting Officer            Commissioner of Patents